Sept. 15, 1970     E. O. WANGERIN     3,528,628
REEL SPINDLE DRIVE MEANS FOR FILM READER OR THE LIKE
Filed May 20, 1968
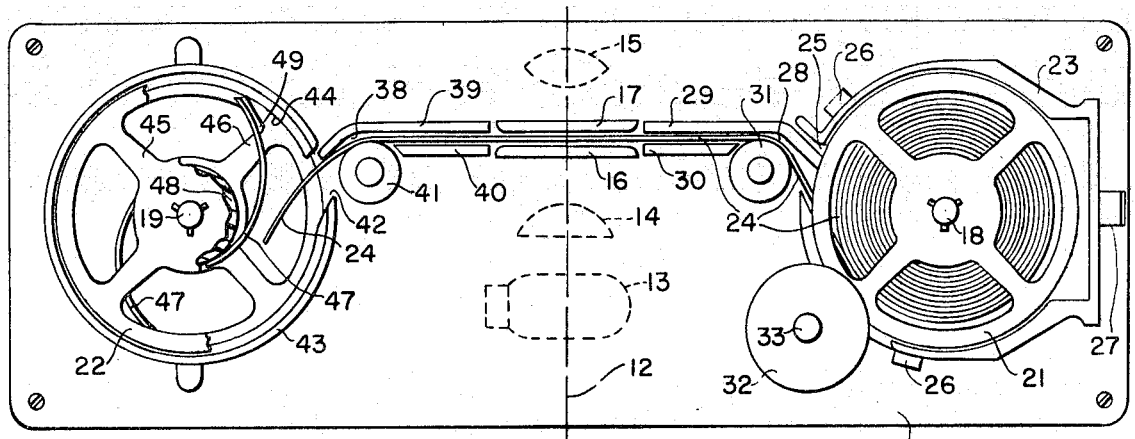
FIG. 1
FIG. 2
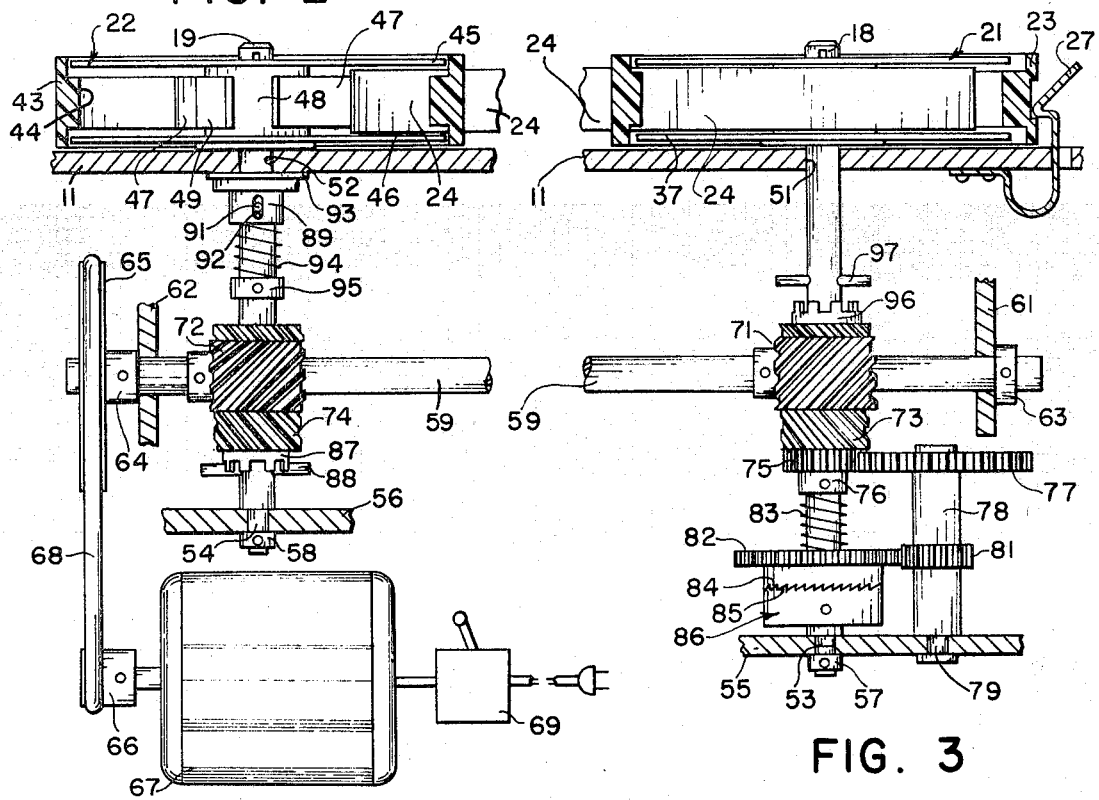
FIG. 3
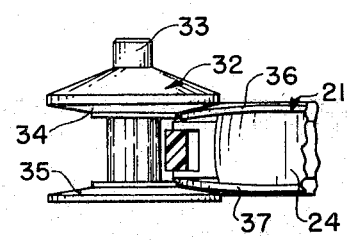
FIG. 4
ELMER O. WANGERIN
INVENTOR.
BY H. Herman Childress
Robert W Hampton
ATTORNEYS

United States Patent Office 3,528,628
Patented Sept. 15, 1970

3,528,628
REEL SPINDLE DRIVE MEANS FOR FILM READER OR THE LIKE
Elmer O. Wangerin, Rochester, N.Y., assignor to Eastman Kodak Company, Rochester, N.Y., a corporation of New Jersey
Filed May 20, 1968, Ser. No. 730,450
Int. Cl. B11b 15/32; G03b 1/04
U.S. Cl. 242—201          7 Claims

ABSTRACT OF THE DISCLOSURE

A reel spindle drive system for use in a film reader or the like in which film is threaded automatically between a supply reel and a takeup reel and is thereafter selectively wound onto the takeup reel or rewound onto the supply reel, comprises a reversible rotating drive member connected to the spindles of both reels through respective novel gear and clutch units including torque responsive means incorporated therein which automatically adjust the units to perform different functions during the respective threading, winding and rewinding operations.

BACKGROUND OF THE INVENTION

Field of invention

The present invention relates to film winding devices or the like and, more particularly, to a simple and inexpensive spindle drive system particularly suitable for a film reader or similar unit adapted to thread a length of film automatically between a supply reel driven by one reel spindle and a takeup reel driven by another reel spindle, whereupon the reels can be driven selectively by their spindles to wind film onto the takeup reel or to rewind it onto the supply reel.

Description of the prior art

In film reader units and related devices such as motion picture projectors, which operate by moving a strip of film through a film gate or equivalent means between a pair of film supply and takeup reels, it is well-known to provide power operated means for selectively winding the film through the gate in either direction. In film readers, for example, this feature allows the operator to move the film selectively in either direction to display different film frames; whereas in a motion picture projector, equivalent means may be employed to provide both forward and reverse film projection. Briefly, this is accomplished by driving the spindle of the film takeup reel in a film winding direction while imposing a slight resistance to the rotation of the supply reel spindle to wind the film from the supply reel onto the takeup reel; and by driving the supply reel in a rewinding direction while retarding the takeup reel to wind the film back onto the supply reel.

Also, it is known to provide such an apparatus with a film stripping and threading device which automatically separates the leading end of a film strip from the film roll on the film supply reel, threads the separated film end through the gate, and causes it to be attached to the hub of the takeup reel. In some devices of this type, the film supply reel is driven in an unwinding direction during the film stripping and threading operation by means other than the film supply reel spindle, thereby allowing the takeup reel to be rotated simultaneously in a winding direction by adjusting the spindle drive mechanism to the same mode of operation by which the film is subsequently wound onto the takeup reel. In the type of film stripping and threading device to which the present invention relates, though, the film supply reel is driven by its spindle both during the stripping and threading operation and also during the rewinding operation. However, to perform properly, the supply reel must be driven more slowly during the stripping and threading operation than during the rewind operation.

More specifically, the present invention involves the incorporation in such an apparatus of a film stripping and threading system of the type disclosed in commonly assigned pending U.S. patent application Ser. No. 591,235, entitled, "Strip Material Storage and Feed Arrangement," filed in the name of Norman J. Rosenburgh on Nov. 1, 1966. In such a system, the film supply reel is partially enclosed by a magazine member and the reel flanges are engaged and flexed together at a predetermined point by a roller member as the reel is driven in an unwinding direction; thereby causing the leading end of the film strip to separate tangentially from the coil of the strip and to emerge from the magazine member into a guide channel leading through the film gate to the takeup reel. As the leading end of the film emerges from the guide channel beyond the gate, it is directed between the flanges of the takeup reel, which is simultaneously rotating in a winding direction at a speed faster than that of the supply reel. The takeup reel is provided with a film gripping member adapted automatically to engage and secure the leading end of the film strip to the takeup reel hub, whereupon the speed at which the film is wound through the gate is determined by the speed of rotation of the takeup reel.

Although the stripping and threading system just described is considerably simpler in overall construction than those systems employing auxiliary supply reel drive means during the film stripping and threading operation, the use of such a system in combination with the aforementioned type of reversible winding mechanism is complicated somewhat by the need for providing three different modes of driving engagement between the reel spindles and the power operated drive means associated therewith. In other words, in such a construction, the spindle drive system must be adjustable to: (1) a stripping and threading condition in which the takeup spindle is driven in a winding direction as the supply spindle is simultaneously driven at a slower speed in an unwinding direction; (2) a winding condition in which the takeup spindle is driven in a winding direction while the supply spindle is allowed to be rotated by the tension of the film strip; and (3) a rewind condition in which the takeup spindle is allowed to be rotated by the film tension as the supply spindle is driven in a rewinding direction at a speed greater than that at which it is driven in the opposite direction during the stripping and threading operation.

SUMMARY OF THE INVENTION

The present inventionn relates to providing a film reader or the like with the three different modes of spindle operation summarized above, by means of a simple and reliable spindle drive system which is adjusted automatically by torque responsive means in accordance with the direction of rotation of a reversible drive motor. In the illustrated preferred embodiment of the invention, this is accomplished by providing the film supply and takeup spindles with respective gear and clutch units, both of which are geared to a common drive shaft connected to a reversible motor. Whenever the motor rotates the drive shaft in one direction, such rotation of that shaft automatically adjusts the takeup spindle gear and clutch unit to effect a positive driving connecion between the drive shaft and the takeup spindle to drive the takeup reel in a film winding direction. Similarly, the same rotation of the shaft simultaneously adjusts the gear and clutch unit of the film supply spindle to positively drive the supply spindle in an unwinding direction at a slower speed than that of the take-up spindle. As soon as the film is attached to the takeup reel, however, the takeup spindle determines the winding speed of the film by overpowering the supply spindle through the agency of an overriding clutch incorporated in the supply spindle clutch and gear unit. When the motor is reversed, the corresponding reversal of the drive shaft causes the takeup spindle to be disengaged from positive engagement with the shaft and to be retarded by a friction brake device. Concurrently, the reverse rotation of the drive shaft also adjusts the supply spindle gear and clutch unit to disable its overriding clutch and to provide a faster gear ratio between the drive shaft and the supply spindle so that the latter is positively rotated in a rewinding direction at a relatively high speed.

From the foregoing, it will be apparent that the operation of the system can be controlled entirely by a single, simple and inexpensive switch device adapted to control the direction and perhaps also the speed of rotation of the drive motor. Furthermore, since this system is entirely free of mechanical adjusting linkages or the like connecting the spindle drive units with each other or to other control elements, the invention greatly facilitates providing the respective gear and clutch units as bench assembled unitary assemblies which can be easily installed in or removed from the apparatus for manufacturing and servicing purposes.

Various means for practicing the invention and other advantages and novel features thereof will be apparent from the following detailed disclosure of an illustrative preferred embodiment of the invention, reference being made to the accompanying drawings in which like reference characters refer to like elements.

BRIEF DESCRIPTION OF THE DRAWINGS

In the accompanying drawings:

FIG. 1 is a plan view of the horizontal film deck portion of a film reader unit embodying a spindle drive system in accordance with a preferred embodiment of the present invention;

FIG. 2 is a partial front elevational view of the film takeup spindle portion of the structure depicted in FIG. 1, with portions of the stationary elements of the structure shown cross sectioned along the plane of the two spindle members;

FIG. 3 corresponds to FIG. 2 and illustrates the film supply spindle portion of the structure illustrated in FIG. 1, and FIG. 4 is an elevational view showing the manner in which the pinch roller engages the flanges of the film supply reel to separate the leading end of the film from the film supply roll during a film stripping and threading operation

DESCRIPTION OF THE PREFERRED EMBODIMENT

In accordance with the preferred embodiment of the invention shown in the accompanying drawings, a film reader unit or similar apparatus includes a housing, not shown, to which a generally horizontal film deck member 11 is supported below and in parallel relation to the axis 12 of an optical system represented by projection lamp 13, condenser lens 14 and objective lens 15. Between the condenser and objective lenses 14 and 15, a pair of closely spaced parallel transparent gate members 16 and 17 are mounted to the deck member 11 in alignment with optical axis 12 and in normal relation thereto; whereby a portion of a film strip 24 received between the gate members 16 and 17 is positioned at a flat focal plane of the objective lens 15. Thus, an enlarged image of the portion of the film strip 24 in the film gate defined by the gate members 16 and 17 can be projected onto a viewing screen. Typically, the viewing screen comprises a translucent sheet incorporated in the reader housing in optical alignment with a mirror system adapted to reflect the projected image of the film onto the rear surface of the screen.

Toward the opposite ends of the film deck membr 11, rotatable film supply and takeup spindles 18 and 19 are mountd in parallel relation to the gate member and are adapted respectively to support film supply and takeup reels 21 and 22 which are keyed or splined in rotational driving relation thereto.

The film supply reel 21 mounted on spindle 18 is provided with a magazine member 23 of the type disclosed in detail in the previously mentioned pending U.S patent application. The magazine member 23 extends radially inwardly beyond the edges of the reel flanges to laterally eencircle the strip of film 24 wound onto the reel 21, except in the region of a radial magazine opening or throat shown at 25; and is retained in a predetermined position on the deck member 11 by guide lugs 26 and by a releasable clip member 27 or equivalent means. In this position, the throat 25 of the magazine 23 is aligned with the corresponding end of film guide channel 28, which is defined by stationary guide members 29 and 30 and by rotatable guide roller 31 to establish the path of movement of the film strip 24 between the film gate and the supply reel 21.

As is also described in greater detail in the aforementioned pending U.S. patent application, a rotatable spool-like roller 32 is rotatably supported by shaft 33 with the conically tapered inner surfaces 34 and 35 of its upper and lower flanges in respectively engagement with the adjacent portions of the upper and lower supply reel flanges 36 and 37, as illustrated in FIG. 4. By this means, successive portions of the supply reel flanges 36 and 37 are flexed toward one another into transverse engagement with successive increments of the outermost convolutions of the coil of the film strip 24 as the supply reel 21 is driven in an unwinding direction by the supply reel spindle 18, i.e., clockwise as depicted in FIG. 1. The resulting transverse distortion of successive increments of the leading end of the film strip 24 causes it to assume a tangential path away from the film roll and to emerge through the magazine throat 25 into guide channel 28.

As the film strip 24 continues to emerge from the magazine unit, guide channel 28 directs it between the gate members 16 and 17, from which it enters a similar guide channel 38 defined by stationary guide wall members 39 and 40 and by guide roller 41. The guide channel 38 is likewise aligned with an open throat 42 in a film guide rim 43 which is attached to the deck member 11 in circumferential relation to the takeup reel 22. Guide rim 43 is substantially similar to magazine member 23 and likewise extends laterally between the corresponding reel flanges to define a smooth circular film guide surface 44 which is uninterrupted except at throat 42.

Between its upper and lower flanges 45 and 46, the takeup reel 22 is provided with a pair of flexible film snubber blades 47, attached at their inner ends of the reel hub 48. At its outer end, each of the blades 47 is provided with a friction tab 49 made of a material such as sponge rubber or the like which has a high coefficient of friction in contact with the film material. As the film takeup reel 22 rotates in a clockwise winding direction during the film threading operation, at a faster speed than the supply reel 21, the leading end of the film strip 24 enters between the flanges 45 and 46 of the takeup reel 22 and is engaged by the friction tabs 49, which frictionally pull the film strip 24 into tight convolutions on the hub 48. When the innermost film convolution is thus formed, subsequent convolutions maintain the film strip 24 in tight frictional contact with the friction tabs 49 on the blade members 47, which are tightly wound against the reel hub 48; thereby securely locking the developing takeup film roll to the reel hub 48. However, it will be apparent that this means for attaching the film to the takeup reel 22 enables it to be released automatically from the takeup reel 22 when it has been completely unwound therefrom by the subsequent rewinding rotation of the supply reel 21 previously described.

The spindle drive system to which the present invention is directed is depicted in detail in FIGS. 2 and 3, which respectively illustrate the components of that system associated with the film takeup spindle 19 and the film supply spindle 18. The respective spindles 18 and 19 are rotatably supported near their upper ends by holes 51 and 52 in the film deck member 11 and are similarly supported at their lower ends by reduced diameter shanks 53 and 54 projecting through corresponding holes in lower bearing plate members 55 and 56. Below the latter bearing plate members 55 and 56, collars 57 and 58 are attached to the lower shank portions of spindles 18 and 19, thereby preventing endwise movement of the spindles 18 and 19.

A drive shaft 59 is rotatably supported in transverse relation to spindles 18 and 19 by stationary bearing plate members 61 and 62 and is prevented from moving axially by thrust collar 63 and hub 64 of pulley 65 at opposite sides of the respective plates 61 and 62. Pulley 65 is belted to a smaller pulley 66 on reversible drive motor 67 by means of belt 68. Accordingly, a double pole double throw switch 69, or an analogous control device can be employed to cause the motor 67 to drive the drive shaft 59 selectively in either direction. Additionally, the motor control unit can be provided with speed control means whereby the speed of rotation of the motor 67 is increased in accordance with the distance by which the control member is moved in either direction from a central open circuit position.

Adjacent to each of the two spindles 18 and 19, a helical driving gear is pinned or otherwise nonrotatably attached to the drive shaft, as shown at 71 and 72. These two driving gears are in constant right angle meshing engagement with corresponding helical driven gears 73 and 74, which are supported respectively by spindles 18 and 19 for both axial and rotational movement relative thereto.

Whenever the drive shaft is driven by motor 67 in a counterclockwise direction, as viewed from the pulley end of the shaft, it will be seen that the left-hand pitch of all four helical gears causes the driven spindle gears 73 and 74 to be rotated in clockwise direction as seen from the top. Therefore, the thrust exerted on the gears 73 and 74 by the mating driving gears urges the driven spindle gears 73 and 74 downwardly. In the case of the film supply spindle assembly, gear 73 is therefore adjusted to its illustrated position in which spur pinion 75 integral therewith is in endwise abutment with fixed spindle collar 76. Consequently, spur pinion 75 is in lateral meshing engagement with a large spur gear 77 on cluster gear member 78 which is rotatably mounted in a fixed axial position to bearing plate 55 by shaft member 79. Below gear 77, the cluster gear member 78 also includes a small spur gear 81 in constant meshing engagement with another larger gear 82. The gear 82, in turn, is rotatably carried by the film supply spindle 18 and is urged downwardly by a light coil spring 83 so that ratchet teeth 84 integral therewith are in clockwise driving engagement with similar teeth 85 of overriding clutch member 86 pinned to spindle 18. Thus, the counterclockwise rotation of the drive shaft 59 is translated into positive clockwise (unwinding) rotation of the film supply spindle at a substantially reduced speed through the gear train comprising gears 71, 73, 75, 77, 81, and 82, and through the driving connection between the opposite sets of ratchet teeth 84 and 85.

Simultaneously, the corresponding downward thrust imparted by the counterclockwise rotation of the drive shaft to helical driven gear 74 on the takeup spindle 19 causes its castellated lower end portion 87 to engage a pin 88 extending through the spindle 19. Accordingly, gear 74 is positively clutched in driving engagement with the film takeup spindle 19 so that the latter is driven in a clockwise (winding) direction but at a considerably faster speed than that simultaneously imparted to the film supply reel 21 by spindle 18.

As hereinafter explained, the film takeup spindle 19 is provided also with a friction brake member 89 which is prevented from rotating on the spindle 19 by a pin 91 extending into an elongate slot 92. A friction washer 93 is attached to the top surface of the friction brake member 89 and is thereby urged upwardly into engagement with the lower surface of film deck member 11 by spring 94 compressed between friction brake member 89 and fixed collar member 95. Hence, the rotation of the film takeup spindle 19 is resisted by a predetermined frictional drag, which, however, is insufficient to prevent winding rotation of the takeup reel 22 by the drive motor 67 in the manner just described.

When the clockwise rotation of both reels 21 and 22 has caused the film strip 24 to become securely attached to the takeup reel 22, the greater driven speed of the latter reel 22 immediately develops tension of the film strip 24 which tends to unwind the supply reel 21 faster than the speed at which it was theretofore driven through its corresponding reduction gear train. Consequently, the overriding clutch disengages the film supply spindle 18 from the gear train as the ratchet teeth 85 of the clutch member 86 overrides the teeth 84 of gear 82 by forcing the latter teeth 84 upwardly against the influence of spring 83. As long as such film winding continues, the overriding clutch maintains a predetermined tension on the film strip 24 and thereby promotes the formation of uniform tight convolutions on the takeup reel 22. Also, this braking effect is beneficial in reducing the coasting tendency of the supply reel 21 when the motor 67 is shut off, thus minimizing the development of excessive slack between the two reels.

When the direction of rotation of the drive shaft 59 is reversed, it is apparent that both of the helical driven gears 73 and 74 are driven in the opposite direction, i.e., counterclockwise and that they are urged upwardly by the thrust of the mating driving gears 71 and 72. Consequently, supply spindle gear 73 assumes a position in which its castellated upper end portion 96 is engaged with pin 97 to lock the gear 73 in direct driving engagement with spindle 18 and to disengage spur pinion 75 from gear 77. Therefore, the supply reel 21 is driven in a winding direction independently of the speed reducing cluster gear assembly and the overriding clutch to rewind the film strip 24 at a relatively high speed. Concurrently, the corresponding upward thrust on the takeup spindle gear 74 moves it upwardly into contact with collar member 95, thus disengaging the castellated portion 87 of gear 74 from positive driving engagement with pin 88 of the takeup spindle 19. Accordingly, the positive rewinding rotation of the supply spindle 18 now causes the film strip 24 to be rewound onto the supply reel 21 under controlled tension resulting from the retarding friction influence of friction brake member 89 on the unwinding rotation of the takeup spindle 19.

The invention has been described in detail with reference to preferred embodiments thereof, but it will be understood that variations and modifications can be effected within the spirit and scope of the invention as described hereinabove and as defined by the appended claims.

I claim:
1. In strip handling apparatus including:
   (a) a rotatable supply spindle for supporting rotatably a roll of elongate strip material having a leading end;
   (b) a rotatable takeup spindle including support means for receiving the elongate strip material, and
   (c) threading means for separating the leading end of the strip material from the roll and for securing the strip material to the support means for rotation with said takeup spindle,
the improvement comprising in combination:
   (d) a selectively reversible drive means;

(e) a drive shaft selectively rotatable in opposite first and second directions by said drive means;
(f) drive transfer means coupled to said drive shaft, said transfer means being
   (1) responsive to rotation of said drive shaft in said first direction to impart a rotation to said takeup spindle in a strip winding direction at a first angular velocity while imparting a rotation to said supply spindle in a strip unwinding direction at a second angular velocity slower than than said first angular velocity, and
   (2) responsive to the rotation of said drive shaft in said second direction to impart a rotation to said supply spindle in a strip winding direction at a third angular velocity faster than said second angular velocity while said takeup spindle is disassociated from said drive shaft.

2. In a strip handling apparatus including:
(a) a rotatable supply spindle for supporting rotatably a supply reel carrying a roll of elongate strip material,
(b) a rotatable takeup spindle for supporting rotatably a takeup reel, and
(c) threading means for separating the leading end of the strip material from the roll and attaching the same to the takeup reel in response to rotation of the supply reel by said supply spindle in an unwinding direction and concurrent but faster rotation of the takeup reel in a winding direction by said takeup spindle,
the improvement comprising in combination:
(d) a selectively reversible drive motor,
(e) a drive shaft selectively rotatable in opposite first and second directions by said drive motor,
(f) gear drive means adjustable
   (1) to a first condition in which rotation of said drive shaft in said first direction imparts rotation to said takeup spindle in an unwinding direction at a first angular velocity and simultaneously imparts rotation to said supply spindle in an unwinding direction at a second angular velocity slower than said first angular velocity, and
   (2) to a second condition in which rotation of said drive shaft in said second direction imparts rotation to said supply spindle in a winding direction at a third angular velocity faster than said second angular velocity while said takeup spindle is operatively disengaged from driving association with said drive shaft, and
(g) adjusting means responsive to the direction of rotation of said drive shaft for adjusting said gear drive means
   (1) to said first condition whenever said drive shaft is rotated by said drive motor in said first direction, and
   (2) to said second condition whenever said drive shaft is rotated by said drive motor in said second direction.

3. The invention defined by claim 2 including overriding clutch means operatively interposed between said drive shaft and said supply spindle when said gear drive means is adjusted to said first condition to thereby allow the angular velocity of said supply spindle to exceed that imparted thereto from said drive shaft so that the linear velocity with which the strip material is directed from the supply reel onto the takeup reel is determined by said second angular velocity with which said takeup spindle is driven by said drive shaft in a winding direction.

4. A spindle drive assembly comprising:
(a) a drive shaft;
(b) a reversible drive motor for rotating said drive shaft in a first direction and in a second opposite direction;
(c) a spindle member rotatably supported,
(d) a helical driving gear positively attached to said drive shaft,
(e) a helical driven gear meshed with said driving gear, said driven gear being supported rotatably on said spindle member for axial movement therealong
   (1) in one direction to a first position as a result of the axial thrust imparted to said helical driven gear by the rotation of said helical driving gear in said first direction and
   (2) in the opposite direction to a second position as the result of the opposite axial thrust imparted to said helical driven gear by the rotation of said helical driving gear in said second direction, and
(f) clutch means carried by said helical driven gear and said spindle member and adapted
   (1) to couple said helical driven gear in direct rotational driving engagement with said spindle member when said helical driven gear is disposed in said second position and
   (2) to disengage said driven gear from direct rotational driving engagement with said spindle member when said helical driven gear is in said first position.

5. The invention defined by claim 4 including:
(a) a gear train for transmitting a rotational torque from an input end to an output end in driving cooperation with said spindle member, and
(b) coupling means adapted
   (1) to engage said helical driven gear in driving engagement with said input end of said gear train when said helical driven gear is in said first position and
   (2) to disengage said helical driven gear from driving engagement with said input end of said gear train with said helical driven gear is in said second position.

6. The invention defined by claim 5 including:
(a) a first gear element carried by said helical driven gear for movement upon said helical driven gear with respect to said spindle member,
(b) a second gear element included in said gear train, said second gear element being rotatable about an axis, and
(c) means positioning said second gear element along said axis at a fixed position at which said second gear element is
   (1) meshed with said first gear element whenever said helical driven gear is in said first position, and
   (2) disengaged from said first gear element whenever said driven gear is in said second position.

7. The invention defined by claim 6 including an overriding clutch adapted to transmit torque from said helical driven gear to said spindle member in a given direction via said gear train when said drive shaft is being rotated in said first direction.

References Cited

UNITED STATES PATENTS 2,624,214   1/1953   Arensberg _____ 74—665
2,652,910   9/1953   Godeck _____ 192—4

LEONARD D. CHRISTIAN, Primary Examiner

U.S. Cl. X.R.
74—665; 242—67.4